July 1, 1958
E. R. RANARD
2,840,919
CAM-RISE GAUGE
Filed Jan. 9, 1956
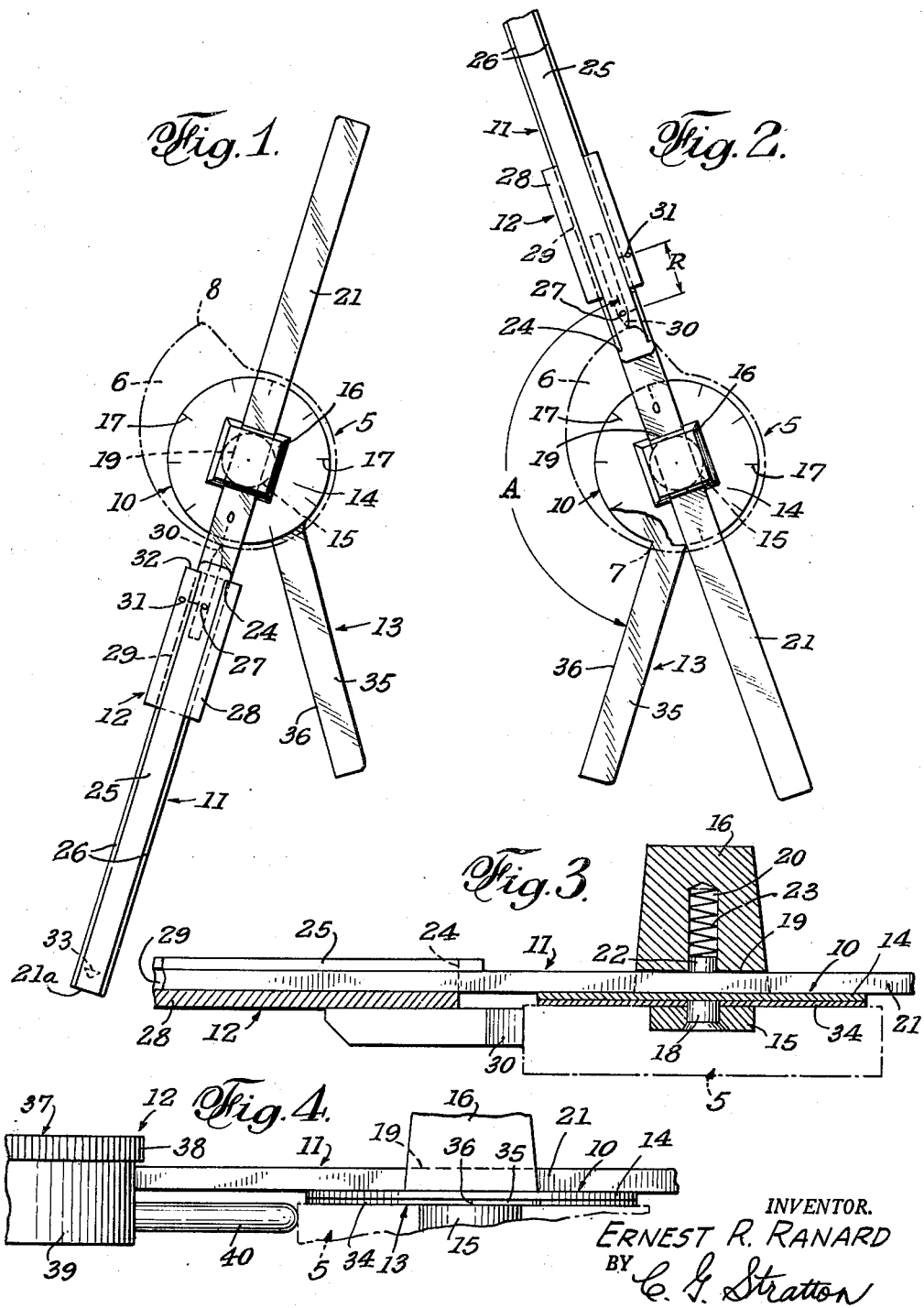
INVENTOR.
ERNEST R. RANARD
BY C. G. Stratton
ATTORNEY United States Patent Office 2,840,919
Patented July 1, 1958

2,840,919

CAM-RISE GAUGE

Ernest R. Ranard, Huntington Park, Calif.

Application January 9, 1956, Serial No. 558,089

3 Claims. (Cl. 33—174)

This invention relates to a gauge for measuring the characteristics of cams, particularly the rise of a lobe of said cam and the angle included between any two peripheral points thereof.

While useful for ascertaining the characteristics of flat cams generally, the present invention is particularly useful to measure the characteristics of the cams of screw machines and the like, so that tooling up of such machines is greatly facilitated.

An object of the present invention is to provide a simple, inexpensive and easily applied gauge to measure the radial rise of a point on a cam lobe with respect to a low point of a cam and also the angle included between said low point and the point of the cam lobe.

Another object of the invention is to provide a gauge of the character indicated that, within the range of its size, is readily adapted to measure the characteristics of both large and small cams, the adjustment to the cam size being rapidly achieved.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designate similar parts in the several views.

Fig. 1 is a plan view of a gauge according to the present invention and in its initial position of adjustment on a cam preparatory to measuring the rise and angle of a lobe of said cam with respect to said initial position.

Fig. 2 is a similar view showing the gauge in lobe-measuring position.

Fig. 3 is an enlarged longitudinal sectional view of the portions of said gauge that engaged with a cam.

Fig. 4 is a similarly enlarged fragmentary side elevational view of a modification.

The drawing, in dot-dash lines, shows a cam 5 which is shown in Figs. 1 and 2 with a single lobe 6. It will be understood that the cam may have more than one lobe and the characteristics thereof may be measured with reference to any point 7 on the periphery of the cam. For the purposes of this disclosure, it is assumed that said lobe 6 has a point 8 and it is desired to measure the rise between said points 7 and 8 and also the angle included therebetween.

The gauge that is illustrated comprises, generally, a cam-engaged base 10, a size-adjustable slide 11 carried by said base, rise-adjustable means 12 carried by the slide 11, and an angle indicator 13 rotationally carried by said body.

The base 10 is shown as comprising a preferably circular plate 14 that is adapted to be placed in flat-wise engagement with the face of cam 5, a pilot projection 15 carried centrally by said plate and adapted to enter a recess provided in said cam face to hold the plate 14 coaxially with the cam, and a manual knob 16 extending from the side of plate 14 opposite to the side from which pilot 15 extends.

The plate 14 is provided with circumferential graduations 17, either in degrees or in other uniform increments, such as tenths and hundredths of a circumference. The latter increments enable ascertaining the percentage relationship that the angle between two points such as 7 and 8 has with relation to the full circumference (100%) of the cam.

The pilot projection 15 is shown as rotationally carried by a stud 18 extending from the center of plate 14. Thus, even when said stud is tightly fitted in a pilot recess of the cam, said plate 14 is adapted to be freely rotationally moved, as desired.

The knob 16 constitutes a handle by means of which the gauge may be manipulated and is shown as provided with a slideway 19 that extends diametrally with respect to the plate 14. It wil be noted that said slideway is on a diameter on which zero of the graduations 17 resides. Axially aligned with stud 18, the knob 16 is provided with a bore 20 that is closed at the top and opens on the mentioned slideway.

The slide 11 comprises a bar 21 that is slidingly fitted in the slideway 19. Said bar is adapted to be longitudinally adjusted with respect to the base 10 and the adjustment maintained by frictional engagement of a follower 22 in bore 20 under bias of a spring 23. Thus, it is a simple matter to adjust the slide bar 21 merely by moving the same, in one direction or the other, relative to the base 10, the friction imposed by follower 22 and created thereby between said bar and plate 14 maintaining the adjustment.

The portion of the bar 21 that extends over the zero side of plate 14 is provided with a shoulder or shoulders 24, the same facing toward the end of said bar portion and provided on a thickened part 25 of said bar portion. The part 25 is preferably narrower than bar 21 and defines longitudinal rabbets 26 between shoulders 24 and the end 21ª of the bar. The face of part 25 is provided with scale graduations represented by the zero at 27.

The rise-adjustable means 12 is shown in Figs. 1, 2 and 3 as a member having sliding engagement with slide 11 and peripheral engagement with cam 5. To this end, said means comprises a slide 28 that a key slot-shaped slideway 29 in which the mentioned thickened portion of bar 21 is engaged, and said slide 28 is provided with a cam-edge-engaging part 30 that is arranged to be radial to the plate 14 and thus radial to the cam to which applied. Said slide 28 is provided with graduations represented by the zero at 31, the same providing a vernier scale readable in connection with the graduations represented by zero 27. As seen in Fig. 1, when shoulders 24 are engaged with the adjacent end 32 of the slide 28, the zeros 27 and 31 are in register.

A stop 33 may be provided adjacent bar end 21ª to limit the endwise movement of slide 28 and separation thereof from the slide 11.

The angle indicator is shown as a flat member 34 interposed between plate 14 and pilot projection 15 and provided with an extension 35 that has a radial edge 36. Said indicator is rotational relative to the plate 14.

*Operation*

To determine the rise of lobe 6 and the angle between cam points 7 and 8, the slide 11 is first pulled in a direction to bring the part 30 clear of the cam edge and the pilot projection is placed in the seat provided in the face of the cam. While keeping the shoulders 24 and end 32 abutted, the slide 11 is then pushed in the opposite direction to bring part 30 against the cam edge. The gauge is then rotated to bring said part 30 on the cam point 7. Fig. 1 shows this condition and it is immaterial where the angle indicator 13 is located since the same is not used at this time.

Now, the gauge is rotated, on the axis of cam 5 around pilot projection 15, to bring the part 30 in register with point 8. Since bar 21 is retained against endwise movement by the described friction means, the slide 12 is moved outwardly along part 25 as the part 30 rides the edge of the lobe 6. Thus, as seen in Fig. 2, the displacement of said slide 12 may be read as the rise R on the related scales 27 and 31 and this is the differential between the length of the radius at point 7 an the length of the radius at point 8. If point 8 is initially marked, the same can readily be found; if not, the same can be found by watching the scales 27 and 31 and arresting the rotation of the gauge when the dimension R is greatest.

Now, by holding the gauge on point 8 and swinging the angle indicator 13 to bring edge 36 thereof aligned with point 7, as in Fig. 2, the angle A between said point and point 8 may be read on the graduation of scale 17 that is aligned with said indicator edge 36.

This operation may be repeated for additional lobes if the cam has more than one lobe. The readings may be made with respect to the initial reference point 7 or, if desired, from the new reference 8. However, the former is preferred.

In the modification of Fig. 4, the slide 28 and the scales 27 and 31 may be replaced by a dial gauge 37 which, in the usual manner, is re-settable to zero by rotation of ring 38 relative to the body 39. This dial gauge conventionally carries an actuator 40 which is the counterpart of part 30, above described, and travels the cam edge in the same way. In other respects, the gauge of Fig. 4 is similar to the one above described and may be used in the same way to give rise R and angle A of a cam lobe.

It will be noted that the bar 21 is preferably transparent so that reading of the scale 17 is facilitated.

While the foregoing has illustrated and described what are now contemplated to be the best modes of carrying out my invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described my invention, what I claim and desire to secure by Letters Patent is:

1. A cam gauge comprising a circular plate provided with peripheral graduations, a stud extending in one direction from the center of said circular plate, a pilot projection rotationally carried by the stud and adapted to enter an axial cavity in the face of a flat cam while the plate is in flatwise relationship to the cam, an angle indicator interposed between the plate and pilot projection and rotationally carried by the stud, said indicator comprising a radial arm having one edge readable in connection with the graduations of the plate, a fixed knob on the plate and extending therefrom in a direction opposite to the stud of said plate, said knob being provided with a slideway that is diametral to the plate, the face of the plate toward the knob defining a wall of said slideway, an elongated slide longitudinally adjustable in said slideway, friction means housed in the knob and creating a pressure upon the slide to bias the same into frictional engagement with the mentioned face of the plate to hold the adjustment of the slide, a transverse shoulder on the slide face in a direction away from the plate and knob, a second slide on the elongated slide and on the portion of the latter that is between said shoulder and the end of the elongated slide beyond said shoulder, means on said second slide for abutting the transverse shoulder, and a cam-edge-engaging part on the second slide and directed toward a cam on which the gauge is mounted, said part being disposed at zero of the graduations of the plate, the mentioned angle indicator being adjustable relative to the mentioned part to define the angle included between said indicator and part.

2. A cam gauge comprising a circular plate provided with peripheral graduations, a stud extending in one direction from the center of said circular plate, a pilot projection rotationally carried by the stud and adapted to enter an axial cavity in the face of a flat cam while the plate is in flatwise relationship to the cam, an angle indicator interposed between the plate and pilot projection and rotationally carried by the stud, said indicator comprising a radial arm having one edge readable in connection with the graduations of the plate, a fixed knob on the plate and extending therefrom in a direction opposite to the stud of said plate, said knob being provided with a slideway that is diametral to the plate and open to the face of said plate, an elongated slide longitudinally adjustable in said slideway, friction means housed in the knob and creating a pressure upon the slide to bias the same into frictional engagement with the mentioned face of the plate to hold the adjustment of the slide, a stop on the slide between one end thereof and the knob, a second slide on the elongated slide and on the portion of the latter that is between said stop and said slide end, means on said second slide for abutting the transverse shoulder, and a cam-edge-engaging part on the second slide and directed toward a cam on which the gauge is mounted, said part being disposed at zero of the graduations of the plate, the mentioned angle indicator being adjustable relative to the mentioned part to define the angle included between said indicator and part.

3. A cam gauge comprising a circular plate provided with stud means extending in one direction from the center of said circular plate and adapted to enter an axial cavity in the face of a flat cam while the plate is in flatwise relationship to the cam, an angle indicator disposed against the face of said plate from which the stud extends and carried by said stud relatively rotationally to the plate, said indicator comprising a radial arm having one edge readable in connection with the graduations of the plate, a fixed knob on the plate and extending therefrom in a direction opposite to the stud of said plate, said knob being provided with a slideway that is diametral to the plate and open to the face of said plate, an elongated slide longitudinally adjustable in said slideway, friction means housed in the knob and creating a pressure upon the slide to bias the same into frictional engagement with the mentioned face of the plate to hold the adjustment of the slide, a stop on the slide between one end thereof and the knob, a second slide on the elongated slide and on the portion of the latter that is between said stop and said slide end, means on said second slide for abutting the transverse shoulder, and a cam-edge-engaging part on the second slide and directed toward a cam on which the gauge is mounted, said part being disposed at zero of the graduations of the plate, the mentioned angle indicator being adjustable relative to the mentioned part to define the angle included between said indicator and part.

References Cited in the file of this patent

UNITED STATES PATENTS

| | | |
|---|---|---|
| 1,270,032 | Johnson | June 18, 1918 |
| 1,314,184 | Clark | Aug. 26, 1919 |
| 1,463,440 | Pichler | July 31, 1923 |
| 2,328,517 | Von Opel | Aug. 31, 1943 |
| 2,682,114 | Ames | June 29, 1954 |

FOREIGN PATENTS

| | | |
|---|---|---|
| 344,334 | Germany | Nov. 19, 1921 |
| 346,805 | Germany | Jan. 5, 1922 |
| 118,233 | Sweden | Feb. 25, 1947 |